(No Model.)

S. FRIEND.
METHOD OF SEPARATING GRAVEL FROM CLAY.

No. 409,187. Patented Aug. 20, 1889.

ATTEST
Helen Graham
W. W. Graham

INVENTOR
SAMUEL FRIEND
By L. P. Graham
his attorney

UNITED STATES PATENT OFFICE.

SAMUEL FRIEND, OF DECATUR, ILLINOIS, ASSIGNOR OF ONE-HALF TO WILLIAM B. CHAMBERS, OF SAME PLACE.

METHOD OF SEPARATING GRAVEL FROM CLAY.

SPECIFICATION forming part of Letters Patent No. 409,187, dated August 20, 1889.

Application filed December 7, 1888. Serial No. 292,871. (No model.)

*To all whom it may concern:*

Be it known that I, SAMUEL FRIEND, of the city of Decatur, county of Macon, and State of Illinois, have invented a certain new and useful Method of Separating Gravel and other Hard Substances from Clay; and I hereby declare the following to be a complete specification of the same.

It is the object of my invention to adapt plastic clay originally containing gravel to be shaped into articles of use and baked or burned; and the invention consists in pressing such clay into sheets thinner than the gravel, and then removing the projecting and therefore accessible gravel from the clay.

Figure 1:
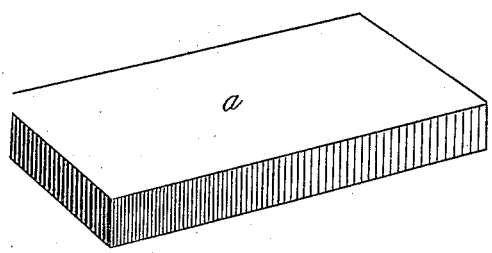
Figure 2:
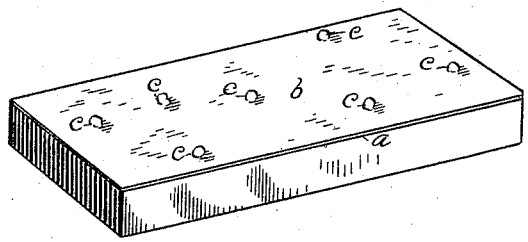
Figure 3:
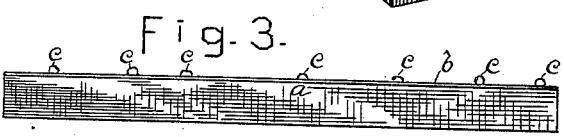
Figure 4:
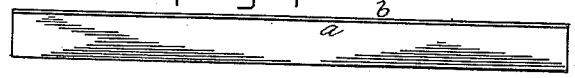
Figure 5:
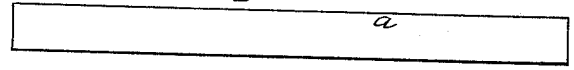

In the drawings accompanying and forming a part of this specification, Figure 1 represents in perspective a plate on which the clay may be pressed into a thin sheet. Fig. 2 represents a similar plate with a sheet of clay formed thereon. Fig. 3 is a side elevation of the plate shown in Fig. 2. Fig. 4 shows the same plate with the gravel removed from the clay. Fig. 5 is still another view of the same plate with both gravel and clay removed, and Fig. 6 shows the essential parts of a machine for doing it.

$a$ is the surface on which the sheet is formed. $b$ is the sheet of clay, and $c$ is the projecting gravel. The sheet is preferably formed with a rotary presser, having its outer surface composed of a yielding substance that will press the clay close around the gravel.

Figure 6:
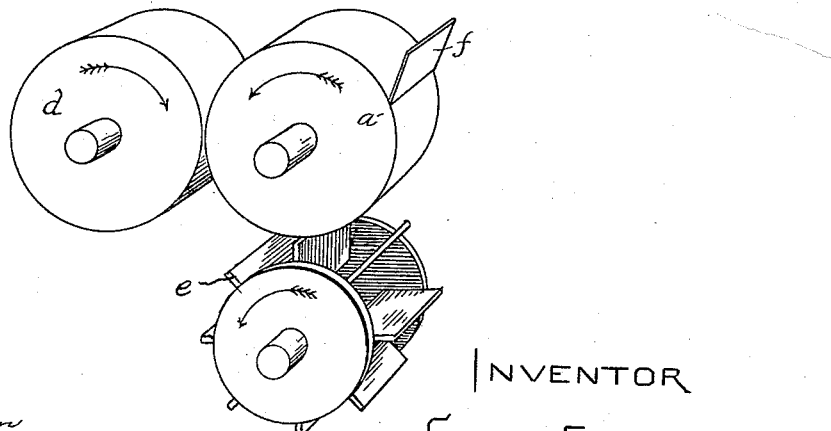

In Fig. 6 is shown the essential elements of a machine that may be used to make the separating operation continuous. $a'$, which is a modification of plate $a$, represents a sheet-receiving roll. $d$ is the rotary presser, having its outer surface composed of a yielding substance. Clay supplied from above will be pressed against the roll $a'$, which may be provided with grooves around its circumference to insure more perfect adhesion. The set of rotary beaters $e$ approach the roll $a'$ sufficiently near to strike the projecting gravel from the sheet of clay. The scraper $f$ constantly maintains its shown position and removes the clay from the roll. The rotating parts move in the direction indicated by their respective arrows, and in practical use are of course provided with supports, gearing, and other necessary adjuncts that will readily occur to those skilled in the art of building machinery.

While the invention is particularly designed to remove gravel from clay, it will be readily seen that other objects of a hard substance will be removed by the same operation that removes the gravel.

The use of my invention will make available large quantities of clay containing gravel, but otherwise desirable, and will increase the value of clay in which the proportion of gravel is not large enough to unfit it for use.

I claim as new and desire to secure by Letters Patent—

1. The method of separating gravel from plastic clay, which consists in pressing the clay into a sheet thinner than the gravel, and then removing the projecting gravel from the sheet of clay, as set forth.

2. The method of separating gravel from plastic clay, which consists in pressing the clay with a yielding presser into a sheet thinner than the gravel, and then removing the projecting gravel from the sheet of clay, as set forth.

In testimony whereof I sign my name in the presence of two subscribing witnesses.

SAMUEL FRIEND.

Attest:
 I. D. WALKER,
 L. P. GRAHAM.

It is hereby certified that in Letters Patent No. 409,187, granted August 20, 1889, upon the application of Samuel Friend, of Decatur, Illinois, for an improvement in "The Method of Separating Gravel from Clay," errors appear in the printed specification requiring the following corrections, viz: In line 26 a period should be substituted for the comma after the word "removed;" and the remainder of the paragraph "and Fig. 6 shows the essential parts of a machine for doing it" should be stricken out; and that the said Letters Patent should be read with these corrections therein that the same may conform to the record of the case in the Patent Office.

Signed, countersigned, and sealed this 22d day of October, A. D. 1889.

[SEAL.]
CYRUS BUSSEY,
*Assistant Secretary of the Interior.*

Countersigned:
C. E. MITCHELL,
*Commissioner of Patents.*